United States Patent [19]

Black

[11] 4,072,373
[45] Feb. 7, 1978

[54] WHEEL CONSTRUCTION
[75] Inventor: John W. Black, Hickory Corners, Mich.
[73] Assignee: Pemco-Kalamazoo, Inc., Kalamazoo, Mich.
[21] Appl. No.: 723,927
[22] Filed: Sept. 16, 1976
[51] Int. Cl.² ............................................. F16C 33/00
[52] U.S. Cl. ..................................... 308/191; 308/72; 301/5.7
[58] Field of Search ................ 308/72, 184 R, 184 A, 308/190, 191, 192, 210, 211; 301/5.7

[56] References Cited
U.S. PATENT DOCUMENTS

| | | | |
|---|---|---|---|
| 2,670,242 | 2/1954 | Beckman | 301/5.7 |
| 3,382,017 | 5/1968 | Cripe | 308/72 X |
| 3,807,817 | 4/1974 | Black | 308/190 |
| 3,933,397 | 1/1976 | Hoad | 301/5.7 X |

Primary Examiner—Joseph F. Peters, Jr.
Assistant Examiner—Gene A. Church
Attorney, Agent, or Firm—Blanchard, Flynn, Thiel, Boutell & Tanis

[57] ABSTRACT

A wheel construction having a wheel with an axially extending hold therethrough and having a first diameter. A preassembled bearing housing having a second diameter less than the first diameter is located inside the hole of the wheel. The axis of the bering housing is concentric with the outside diameter of the wheel. The difference between the first and second diameters defines a spacing therebetween. A moldable synthetic resin material fills the aforesaid spacing and effects a securement of the bearing housing to the wheel.

15 Claims, 2 Drawing Figures

WHEEL CONSTRUCTION

FIELD OF THE INVENTION

This invention relates to a wheel construction and, more particularly, relates to a wheel construction wherein the axis of the preassembled bearing housing is located concentric with the outside diameter of the wheel and a moldable, synthetic resin material fills a spacing between the outer periphery of the bearing housing and the inner diameter of a hole through the center of the wheel to effect a securement of the bearing housing to the wheel. This invention also relates to a wheel construction wherein the synthetic resin material is an elastomeric material having a resilient characteristic so that the wheel is movable against the resilient urging of the elastomeric material relative to the bearing housing when shock loads and the like are applied to the support structure for the wheel construction.

BACKGROUND OF THE INVENTION

The life expectancy of wheel constructions, particularly the type adapted for use with a yoke assembly, is continuously being subjected to review. Generally, it can be stated that the failure of such a wheel construction is primarily due to a failure in the ball-bearing assembly. My U.S. Pat. No. 3 807 817 represents a unique bearing assembly which has substantially prolonged the life of wheel constructions. In addition, such bearing assembly has reduced the cost of the total wheel construction.

The bearing assembly illustrated in my aforementioned U.S. Pat. No. 3 807 817 is a type wherein the axle and the sleeve having the bearings located therebetween are preassembled. However, a problem has existed in assembling the preassembled bearing construction into a wheel and having the axis of the bearing construction end up concentric with the outer diameter of the wheel. In addition, a problem continues to exist in protecting the bearing assembly from shock loads which are, from time to time, applied to the support construction, particularly the yoke. It is well known that the life of a bearing, hence of the wheel upon which it is mounted, is materially affected by the amount of looseness or play in the bearing parts thereof. Thus, where bearing parts are assembled with an excess amount of initial play, the useful life of the bearing is shortened in a corresponding manner. That is, unnecessary runout, radial play or axial play in the bearing parts relative to each other, or in the bearing parts relative to the wheel which they support, will tend to induce or accelerate wear which merely increases the play. In a sense, this results from the fact that the loose parts have an opportunity to hammer each other during normal use of the wheel or other structure in which the loose bearing is used. This acceleration in deterioration of loose bearing assemblies is especially noticeable in situations of severe usage, such as in the wheels of castors.

Furthermore, it has been largely taken for granted that looseness or excess play had to be tolerated in return for low cost bearing constructions. Accordingly, it is not uncommon for certain users, such as owners of supermarket shopping carts, to accept bearing failures in a relatively short period of time due to severe shock loading that can occur during normal use thereof. It is a desire, therefore, of this invention to provide a wheel construction utilizing a bearing assembly which has successfully overcome the problem of developing looseness during use thereof in a wheel and assuring that the outer diameter of the wheel is concentric with the axis of the bearing assembly. In addition, it is desirable to provide a wheel construction wherein the shock loads applied to the wheel construction are isolated from the bearing assembly.

Accordingly, it is an object of this invention to provide a wheel construction wherein the axis of the bearing assembly is assured of being concentric with the outer diameter of the wheel.

A further object of the invention is to provide a wheel construction, as aforesaid, which is particularly adaptable for use in the wheels of a castor or the like where the treatment received by the bearing assembly, even under normal conditions of use, is severe by any reasonable standard.

A further object of this invention is to provide a wheel construction, as aforesaid, having a sufficient structural simplicity that it can be assembled rapidly, accurately and inexpensively.

A further object of the invention is to provide a wheel construction, as aforesaid, comprised of a minimum number of parts, each part being of such structural configuration that it is capable of being assembled so that the strength of the assembly is increased during the assembly.

A further object of the invention is to provide a wheel construction, as aforesaid, in which the bearing assembly can be constructed in a variety of sizes and for a variety of specific uses with a minimum of modifications and structural limitations.

A further object of the invention is to provide a wheel construction, as aforesaid, wherein the full effect of shock loads or the like applied to the wheel construction are isolated from the bearing construction.

SUMMARY OF THE INVENTION

In general, the objects and purposes of the invention are met by providing a wheel construction having wheel means with an axially extending hole therethrough, which hole has a first diameter. Bearing housing means having a second diameter less that the first diameter are located inside the hole with the center of the bearing housing means being concentric with the outside diameter of the wheel means. The difference between the first and second diameters defining a spacing therebetween. A moldable synthetic resin material is utilized to fill the spacing to effect a securement of the bearing housing means to the wheel means.

Other objects and purposes of the invention will be apparent to persons acquainted with wheel constructions of this general type upon reading the following specification and inspecting the accompanying drawing, in which:

FIG. 1 is a side elevational view of a complete castor embodying the invention; and FIG. 2 is a sectional view taken along the line II—II in FIG. 1.

The words "in" and "out", used herein for convenience in reference, will refer to directions toward and away from, respectively, the geometric center of the device and designated parts thereof. Such terminology will include the words above specifically mentioned, derivatives thereof and words of similar import.

DETAILED DESCRIPTION

Figure 1:
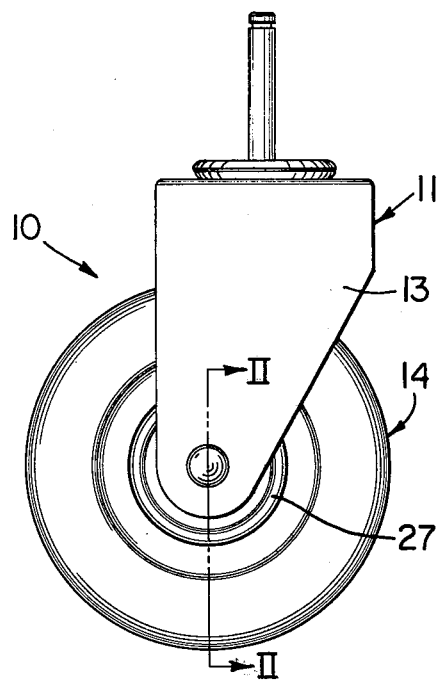

FIG. 1 illustrates a swivel castor 10, which includes an inverted, U-shaped frame 11 having a pair of parallel legs 12 and 13 (FIG. 2) straddling a wheel 14 and a bearing assembly 17 mounted in the central opening 16 of the wheel. An axle 20 extends through the bearing assembly 17 and has an opening 24 therethrough aligned with a pair of axially aligned openings 18 and 19 in the legs 12 and 13, respectively, of the frame 11.

The bearing assembly 17 is identical to the bearing assembly described and illustrated in my U.S. Pat. No. 3 807 817. The bearing assembly 17 includes a hollow, thermoplastic sleeve 21 which is mounted in the central opening 16 of the wheel 14. Bearings 22 and 23 are positioned, as described in my aforementioned patent, between the axle 20 and the sleeve 21.

The bearing assembly 17, which includes the axle 20, the sleeve 21 and the bearings 22 and 23, is positioned along with the shields 26 and 27, between the legs 12 and 13 of the frame 11 so that the opening 24 through the axle 20 is axially aligned with the openings 18 and 19 in the legs 12 and 13, respectively, of the frame 11. A shaft 29 is inserted through the aligned openings 18, 19 and 24 whereby the wheel 14 and bearing assembly 17 are mounted upon the legs 12 and 13 of the frame 11. The opposite ends 31 and 32 of the shaft 29 are staked, or otherwise enlarged, in order to prevent removal of the shaft 29 from the frame 11.

Figure 2:
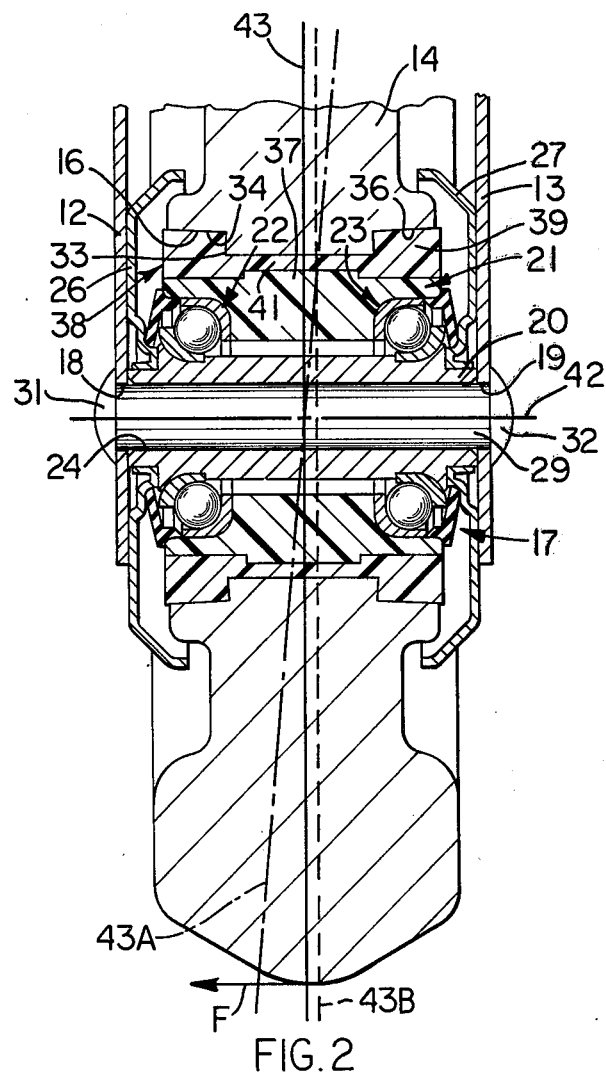

Referring now to the specific construction of the wheel 14 illustrated in FIG. 2, the central opening 16 has a central rib extending radially inwardly thereof. The surface portions 34 and 36 on opposite axial sides of the radial rib 33 are inclined to the horizontal. In this particular embodiment, the inner surface portion 34 extends radially outwardly from the rib 33 as does the inner surface portion 36.

The outer periphery of the sleeve 21 has a radially outwardly extending central rib 37 thereon. The rib 37 is, in this particular embodiment, radially aligned with the rib 33 in the central opening 16 in the wheel 14.

The outer periphery of the sleeve 21 is less in diameter than the diameter of the central opening 16 in the wheel 14 to define a spacing 38 therebetween. Synthetic resin material 39 is injection molded into the spacing 38 and forms one continuous piece of material from one axial side of the wheel construction to the other. The radially aligned ribs 33 and 37 serve to define a narrow gap 41 therebetween and through which the synthetic resin material 39 extends. The portion of the spacing 38 on opposite axial sides of the radially aligned ribs 33 and 37 have a larger radial dimension than the gap 41. As a result, the synthetic resin material 39 serves to secure the bearing assembly 17 in the central opening 16 of the wheel 14.

In one preferred embodiment, the synthetic resin material 39 is ABS (acrylonitrile-butadiene-styrene). This material is well known as a sturdy and very hard composition. Prior to insertion of the ABS material into the spacing 38, the axis 42 is located so as to be concentric with the outer diameter of the wheel 14. Thus, the insertion of the ABS material in the spacing 38 effects a rigid securement of the wheel 14 to the bearing assembly 17.

In another embodiment of the invention, it is proposed to use an elastomeric material as the synthetic resin material 39 having a resilient characteristic, particularly a material that has a memory and returns to the original condition illustrated in FIG. 2 after an abnormal load has been applied thereto to flex the wheel so that the central plane 43 of the wheel 14 is flexed to a position inclined to the axis 42 of the bearing assembly 17, such as schematically represented by the line 43A. In addition, movements of the wheel 14 are also possible in a direction wherein the central plane 43 remains perpendicular to the axis 42 but is simply shifted axially as schematically represented by the line 43B. In the instance where the wheel 14 is moved to a position wherein the central plane 43 is inclined along the line 43A, the wheel 14, in most instances, will strike at least one of the legs 12 or 13 of the frame 11. This load will occur when, and assuming that the wheel has been installed on a shopping cart, the shopping cart has been shifted sidewardly so that the force applied to the wheel 14 adjacent the outer diameter thereof is perpendicular to the tangent at the outer periphery of the wheel 14, such as is illustrated by the vector F in FIG. 2. In this particular embodiment, the elastomeric material 39 is made of a polyurethane, having a hardness of 80 Shore A Durometer. The effective range of hardnesses for the elastomeric material is in the range of 75 Shore A to 55 Shore D Durometer.

Still another embodiment of the invention incorporates the utilization of the polyurethane material described above for the material of the sleeve 21 in the bearing assembly 17. The resilient characteristics of the sleeve 21 will have the same range of hardness as described above for the elastomeric material, namely 75 Shore A to 55 Shore D Durometer. It is also contemplated to utilze the same elastomeric material for both the sleeve 21 and the material 39 injection molded into the spacing 38. The degree of resilientness of the material of the sleeve and the material in the spacing 38 can be selected to provide the desired amount of flexing of the wheel relative to the bearing assembly 17 to achieve the desired isolation of shock loads applied to the wheel 14 from the bearing assembly 17.

In the embodiment wherein the sleeve 21 is made of a resilient elastomeric material, the material will be adapted to flex radially outwardly to accommodate an encirclement of different combinations of different diameter axle and bearing combinations to thereby result in a variable outside diameter for the sleeve 21 with each different combination. In some instances, the shaft 29 is made of a larger diameter for use in heavy-duty environments. In instances where the shaft 29 is increased in size from 5/16 inch to ⅜ inch, for example, the same sleeve 21 can be utilized for both combinations of shafts. The axle 20 will have a larger diameter to accommodate the increased diameter in the shaft 29 and, as a result, the bearings 22 and 23 will also be increased in size. It has been discovered that the resilient characteristic of the sleeve 21 is sufficient to expand in diameter so that the same sleeve 21 can be utilized for several different size shafts 29 and bearing assemblies 17. Since the outer diameter of the sleeve 21 is altered, the only difference that occurs in the wheel construction is the radial dimension of the spacing 38. Since the synthetic resin material 39 is injection molded into the spacing 38, the only thing that needs to be controlled is the size of the shot of elastomeric material 39 into the gap 38. This simple adjustment permits a simple change in the wheel construction without materially altering the construction of the wheel.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A wheel construction, comprising:
   wheel means having an axially extending hole therethrough, said hole having a first diameter;
   bearing means;
   bearing housing means for housing said bearing means therein and having a second diameter less than said first diameter, said bearing housing means being located inside said hole with the center of said bearing housing means being concentric with the outside diameter of said wheel means, the difference between said first and second diameters defining a spacing therebetween;
   a moldable, synthetic resin material filling said spacing; and
   means for positively securing said moldable, elastomeric material in said spacing to effect a securement of said bearing housing means to said wheel means.

2. A wheel construction according to claim 1, wherein said moldable, synthetic resin material occupies the entirety of said spacing from one axially facing side of said wheel means to the other side thereof.

3. A wheel construction according to claim 1, wherein said synthetic resin material is rigid.

4. A wheel construction according to claim 3, wherein said synthetic resin material is ABS (acrylonitrile-butadiene-styrene).

5. A wheel construction according to claim 1, wherein said synthetic resin material is an elastomeric material which is resilient whereby said wheel means is movable relative to said bearing housing means against the resilient urging of said elastomeric material.

6. A wheel construction according to claim 1, wherein said bearing housing means comprises an axle, a cylindrical sleeve, said bearing means being located between said axle and said cylindrical sleeve to facilitate a rotation of said cylindrical sleeve relative to said axle; and
   wherein said cylindrical sleeve is made of a second moldable synthetic resin material; and
   wherein said spacing is located between the outside diameter of said cylindrical sleeve and said wheel means.

7. A wheel construction according to claim 6, wherein the first-mentioned synthetic resin material has a rigid characteristic; and
   wherein said second moldable synthetic resin material of said cylindrical sleeve is an elastomeric material having a flexible characteristic.

8. A wheel construction according to claim 6, wherein the first-mentioned synthetic resin material is an elastomeric material having a flexible characteristic; and
   wherein said second moldable synthetic resin material of said cylindrical sleeve has a rigid characteristic.

9. A wheel construction according to claim 6, wherein both of said first-mentioned synthetic resin material and said second synthetic resin material have a rigid characteristic.

10. A wheel construction according to claim 6, wherein said first-mentioned synthetic resin material and said second synthetic resin material are an elastomeric material having a resilient characteristic.

11. A wheel construction according to claim 6, wherein said second synthetic resin material is an elastomeric material having a radially flexible characteristic to accommodate an encirclement of different combinations of different diameter axle and bearing means assemblies to result in varying outside diameters for said cylindrical sleeve with each different combination to facilitate a use of the same cylindrical sleeve for said different combinations.

12. A wheel construction according to claim 11, wherein said second moldable, elastomeric material has a hardness in the range of 75 Shore A to 55 Shore D Durometer.

13. A wheel construction according to claim 6, wherein said means for positively securing said wheel means to said bearing housing means comprises rib means on at least one of said sleeve and said wheel means and extending radially into said spacing.

14. A wheel construction according to claim 1, wherein said moldable synthetic resin material has a hardness in the range of 75 Shore A to 55 Shore D Durometer.

15. A wheel construction, comprising:
    wheel means having an axially extending hole therethrough, said hole having a first diameter;
    bearing means;
    bearing housing means for housing said bearing means therein and having a second diameter less than said first diameter, said bearing housing means being located inside said hole with the center of said bearing housing means being concentric with the outside diameter of said wheel means, the difference between said first and second diameters defining a spacing therebetween; and
    moldable, synthetic resin means filling said spacing and effecting a securement of said bearing housing means to said wheel means.

* * * * *